May 3, 1949.
H. G. HUGHEY
2,468,824
MULTIPIECE CUTTING TIP
Filed Nov. 23, 1944
4 Sheets-Sheet 1
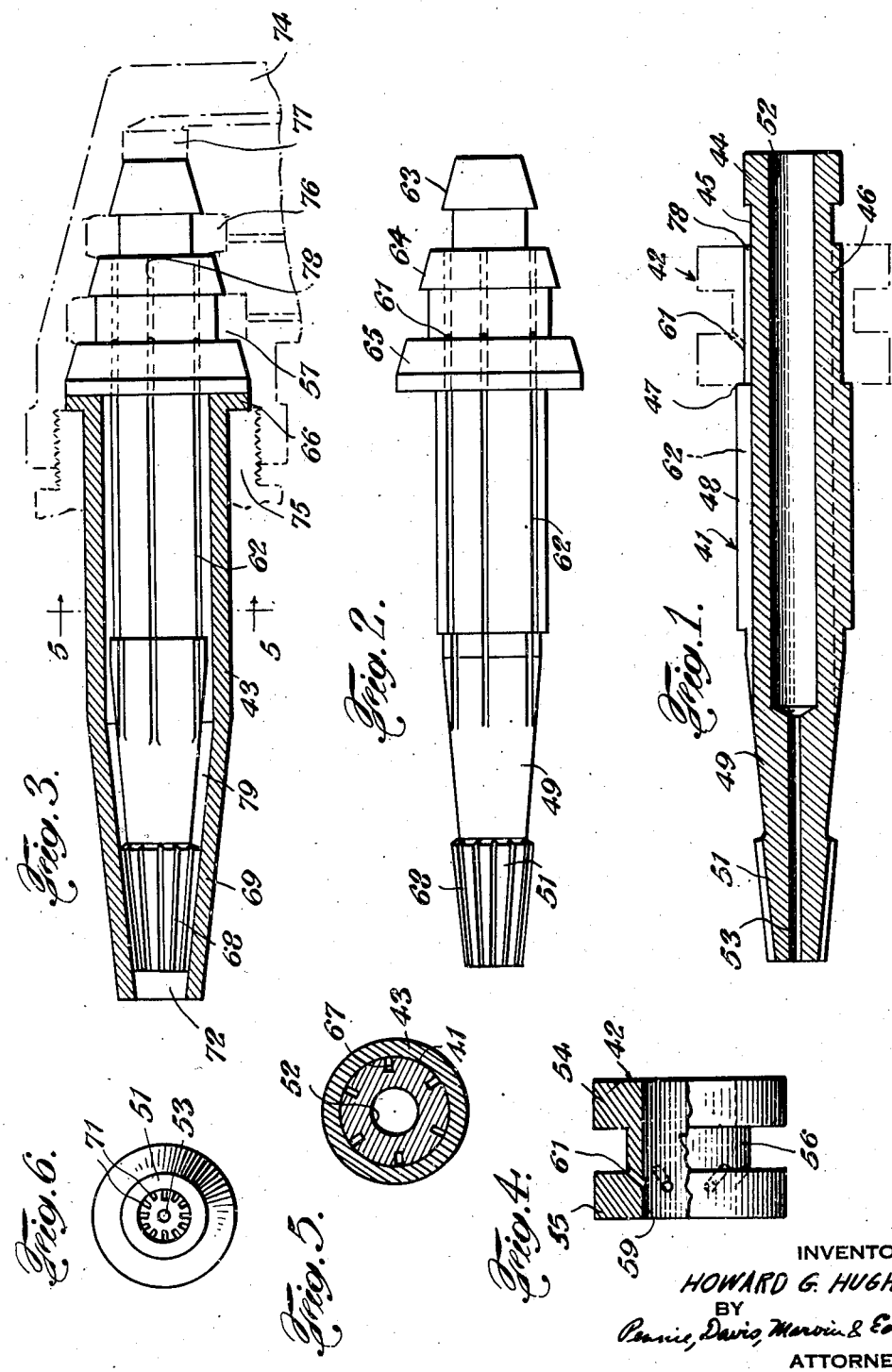
INVENTOR
HOWARD G. HUGHEY
BY
Pennie, Davis, Marvin & Edmonds
ATTORNEYS May 3, 1949. H. G. HUGHEY 2,468,824
MULTIPIECE CUTTING TIP
Filed Nov. 23, 1944 4 Sheets-Sheet 2
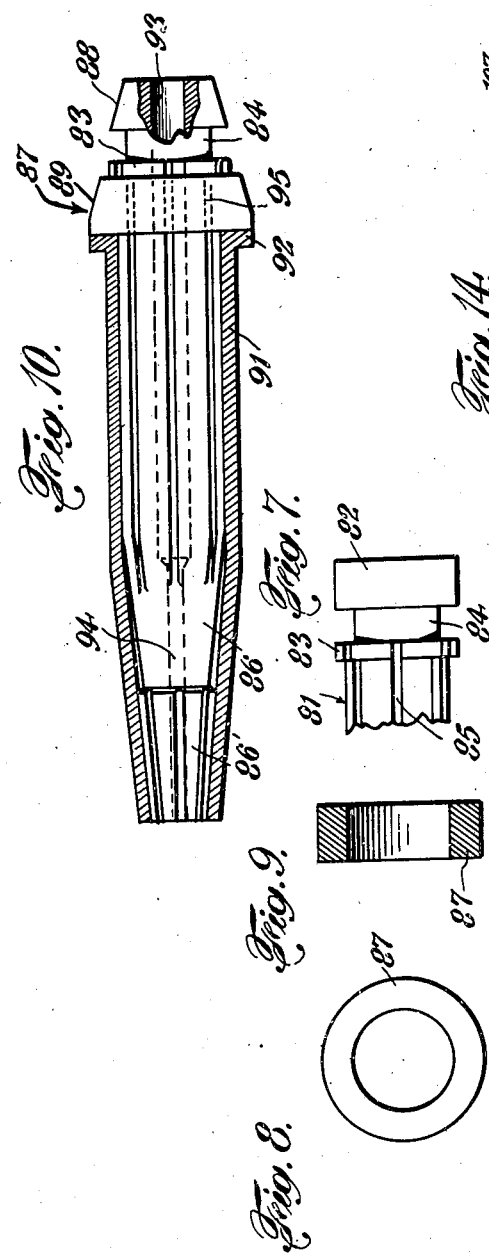
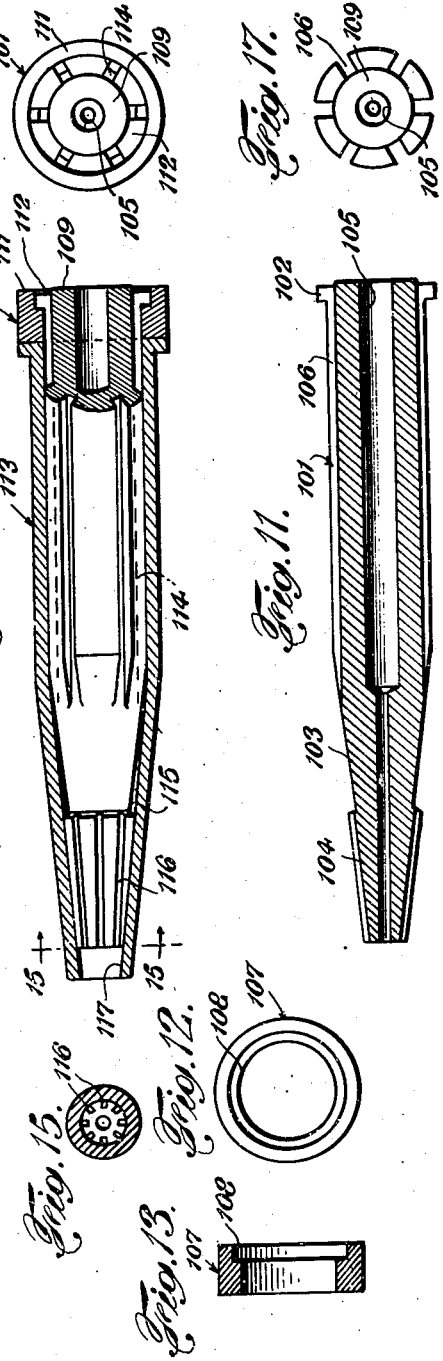
INVENTOR
HOWARD G. HUGHEY
BY
Pennie, Davis, Marvin & Edmonds
ATTORNEYS May 3, 1949. H. G. HUGHEY 2,468,824
MULTIPIECE CUTTING TIP
Filed Nov. 23, 1944 4 Sheets-Sheet 3
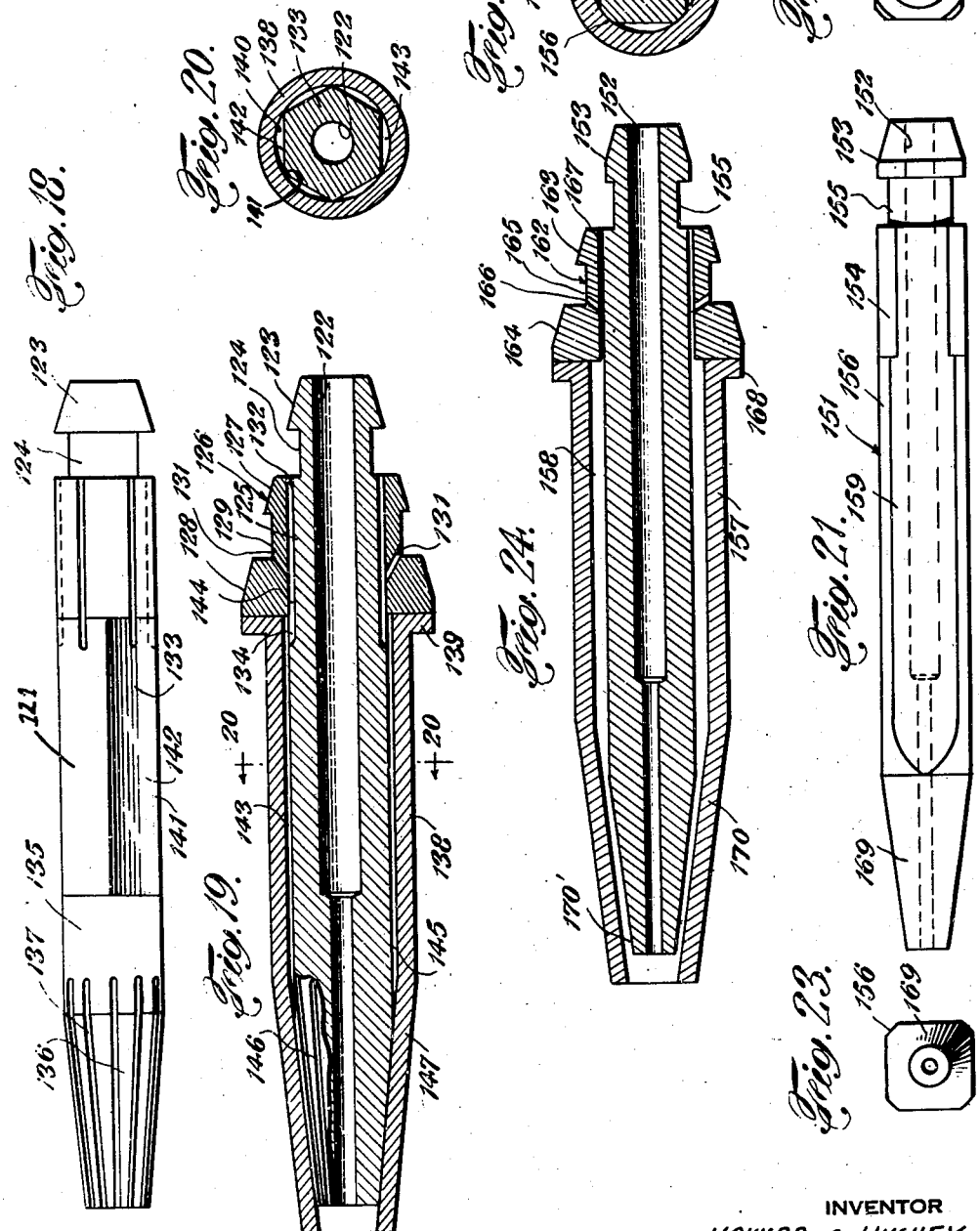
INVENTOR
HOWARD G. HUGHEY
BY
Pennie, Davis, Marvin & Edmonds
ATTORNEYS

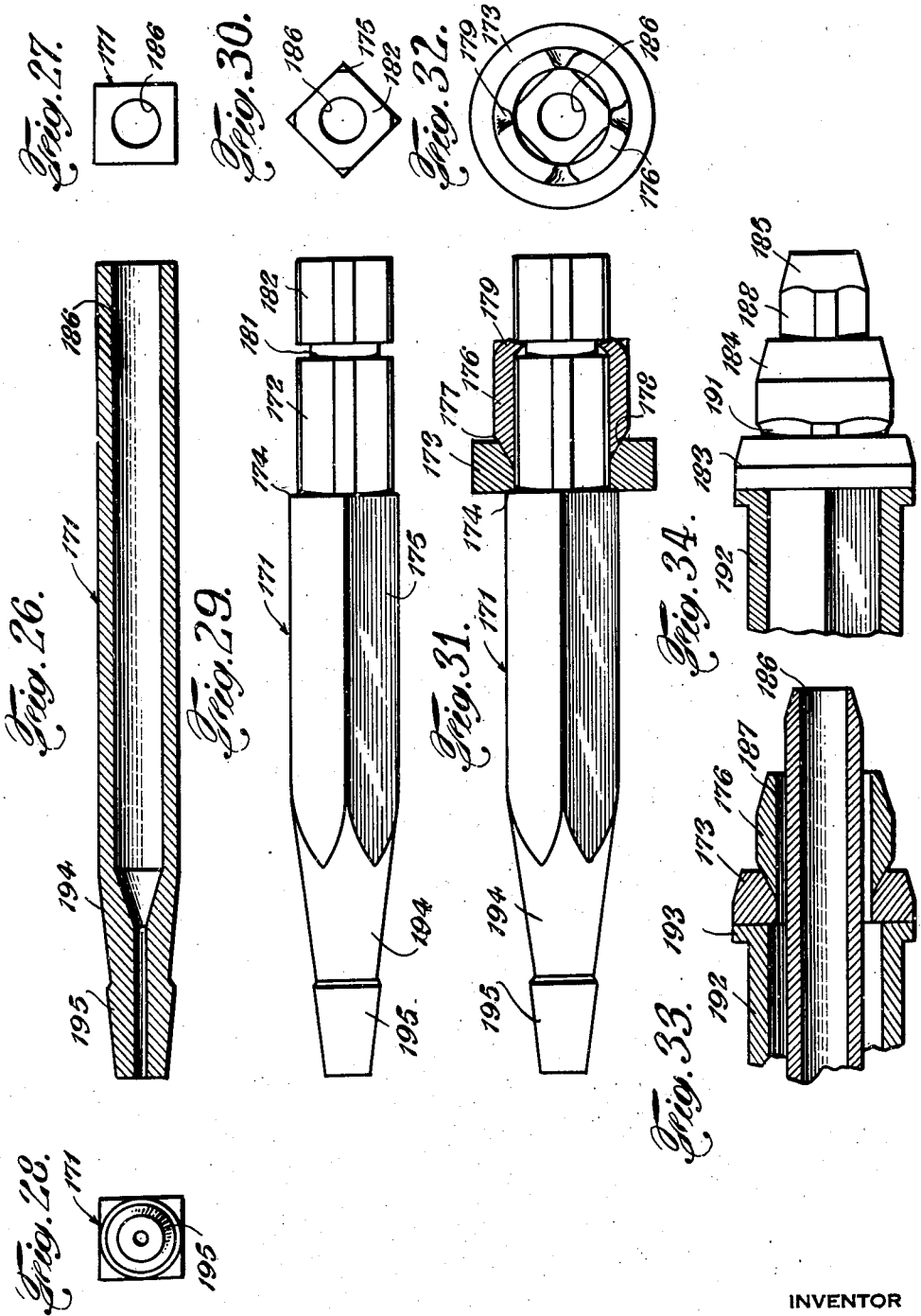

Patented May 3, 1949

2,468,824

UNITED STATES PATENT OFFICE 2,468,824

MULTIPIECE CUTTING TIP

Howard G. Hughey, Fanwood, N. J., assignor to Air Reduction Company, Incorporated, a corporation of New York Application November 23, 1944, Serial No. 564,862

12 Claims. (Cl. 158—27.4)

1

This invention relates to gas torches used for cutting or heating metal pieces, and more particularly to the tips therefor and the method of constructing the same.

Standard torch tips are generally made from a single piece of metal stock on which seat portions are fashioned and through which, including the seat portion, the small heating gas passages are formed by a delicate drilling operation which is expensive due to drill breakage and loss of stock resulting from a drill drifting off from center.

It is the principal object of this invention to provide a torch tip in which the longitudinal heating gas passages may be formed without drilling and be located closer together.

It is another object of the invention to provide a tip which lends itself more favorably to manufacturing practice.

According to the invention, the tip is made from multiple pieces. Instead of drilling holes in the single stock to provide the passages, the passages are provided by milling longitudinal slots in a central core piece or insert and completing the passages with a shell piece or long sleeve fitted tightly about the insert, or by using squared or hexagonal stock for the core piece, with which little or no milling is necessary, and a shell which engages the longitudinal edges, the passages thereby being provided between stock flat faces and the shell inner face. In all forms of the invention, the milled slots or passages formed from the flat faces extend rearwardly to include the seat portions which are fashioned from a thick blank ring or sleeve fitted to the core piece after the slots are formed and machined to provide the seats. The ring is tightly secured to the insert as by shrinking, force fitting, soldering or by extending a pin. The shell piece is removably secured to the insert. Multiple piece tip permits the inner portions of the tip to be of a material which has good machining properties, such as brass, and yet have an outer portion of a heat conducting material such as copper which will stand up under the heating flames. All tips provide means of communication from the rear gas channels forwardly and under the seat ring without the use of longitudinally drilled holes, the seat ring after the slots are formed becoming virtually an integral part of the insert.

By slotting instead of drilling, a cheaper method of forming passages has been provided.

2

Control of passage depth, width and other detail is gained since the forming is done from an open side. When drilling, the hole detail is limited to whatever formation can be obtained through a single hole. The salient advantage of the present method thus lies in being able to make long passages with thin walls between passages without the danger of one hole breaking into another, as in drilling. The slots can also be of V or semi-circular section. The volumetric capacity of the passages may be held low so as to maintain a satisfactory velocity of the mixed gases.

For other objects and for a better understanding of the invention, reference may be had to the following detailed description taken in connection with the accompanying drawing, in which Figs. 1 to 6 are views illustrating the steps in the manufacture of a torch tip of self-mixing type, with Figs. 3, 5 and 6 showing the assembled tip;

Figs. 7 to 10 are views illustrating the construction of a tip adapted to receive previously mixed preheating gases;

Figs. 11 to 17 are views illustrating the adaptation of the present method to the construction of a torch tip of the flat seat type;

Figs. 18 to 20 are views illustrating the construction of a torch tip utilizing an insert made of hexagonal stock;

Figs. 21 to 25 are views illustrating a type of torch tip utilizing an insert of regular square cross-section and with which no slots at all need to be milled;

Figs. 26 to 34 are views of another torch tip using a square insert.

The majority of the tips shown are of the propane type. The propane tip is distinguished from the usual acetylene tip by the larger number of gas passages and by a skirt about the flame root to keep it from lifting and blowing away, high issuing velocities being required with propane gas. The method of construction to be presently described is particularly adapted to the construction of propane tips, though it will be apparent that the method is equally adapted to the construction of the acetylene tips.

Referring to Figs. 1 to 6, a torch tip is shown which is formed from a core or insert 41, a ring 42 and a shell or sleeve 43. The blank stock for the insert 41 was of cylindrical shape but has been turned down to have the longitudinal section of Fig. 1. This section has an unfinished outer seat portion 44, a channel 45 and a machined portion 46 adapted to carry the ring 42, Fig. 4. The ring 42 is preferably shrunk on the machined portion 46, though it may be secured thereto by a pressed or forced fit or by soldering. The ring 42 is pressed onto the machined portion 46 until it abuts a shoulder 47 of a main portion 48. Forwardly of this main portion 48, there extends a tapered portion 49 having a raised fluted section 51.

Through the center of insert 41 and extending from one end thereof to the other, is drilled a cutting gas passage 52 having a restriction 53 in tapered portion 49.

Ring 42 has two unfinished seating portions 54, 55, Fig. 4, spaced by a channel 56 adapted to provide for a fuel gas chamber 57 in the finished tip, Fig. 3. From this channel 56 and into seat portion 55, there is drilled a series of metering ports 61 spaced equally about the ring circumference. These ports are preferably drilled before the ring is assembled to the insert 41.

Prior to the fitting of the ring 42 upon the machined portion 46 of the insert 41, a series of longitudinal slots 62 are milled into the insert. These slots are to serve as the heating gas passages and they extend from the channel 45 to insert tapered portion 49. When the ring 42 is added to the portion 46 of the insert, the metering ports 61 of ring 42 are aligned respectively with corresponding slots 62.

With the ring tightly secured on the insert, the assembled parts are machined to take the form shown in Fig. 2. The portion 44 of insert 41 and unmachined portions 54, 55 of the ring 42 are then machined to provide usual seats 63, 64 and 65.

To this assembly, shell 43 is removably fitted on the insert, Fig. 3, so that a radially extending flange 66 thereof bears against ring 42. In this manner, slots 62 are closed throughout the length of portion 48 to provide complete gas passages 67, Fig. 5. Fig. 5 is a sectional view taken on line 5—5 of Fig. 3. Some clearance in diameter is allowed between the shell and the insert to permit the shell to be easily removed when the assembled tip is removed from the torch head. A clearance of the order of .005" has been found satisfactory in practice. The fact that the passages can be opened up by removal of the sleeve makes it an easy matter to keep the tip passages clean.

The fluted section 51 is similarly provided with a series of slots 68 which are closed by a tapered section 69 of shell 43 to thereby provide fluted gas passages 71, Fig. 6. The present method makes possible the provision of the large numbers of passages that are necessary with propane tips. The shell tapered section 69 is preferably made large and then brought to the size shown by a swaging operation. In final shape, tapered section 69 extends beyond the insert fluted end to provide a skirt 72 which prevents the heating gas flames from being blown away due to the high issuing velocities of the propane heating gases.

With the sleeve assembled to the insert 41, a finished torch tip has been provided which is adapted to be inserted in a standard torch head 74 in the same manner that a standard drilled torch tip is inserted. With the parts tightly secured, the finished tip has all the appearances of an integral or drilled torch tip. A tip nut 75 secures the assembled tip in the torch head 74 abutting the sleeve flange to secure the sleeve tightly against the seat ring. Channel 45 cooperates with head 74 to provide a heating oxygen chamber 76. Heating oxygen enters heating gas passages 67 at 78 and mixes with propane gas entering from metering ports 61. On leaving passages 67 the mixed gases expand in an annular chamber 79 and then enter fluted passages 68. By having the insert exterior diameter under the shell 43 of larger dimension than the diameter under the seat ring, the required control to flow of the gas in the passages is easily provided.

Referring now to Figs. 7 to 10, there is shown a tip of a type where the heating gases are mixed before arriving at the tip. With such tips, only two seats are needed. An insert 81 is fashioned with an untapered seat portion 82, Fig. 7, and a raised shoulder 83 spaced from seat portion 82 by reduced section 84. The insert is otherwise similar to insert 41 above described. Slots 85 are milled in main portion of the insert 81 from tapered portion 86 and through the raised shoulder 83. The tapered portion 86 has a fluted section 86'. After milling slots 85, a single ring 87, Figs. 8, 9, is pressed on the insert from the fluted end and against the raised shoulder 83 at the insert end. The ring can be secured by a shrinking operation or by any of the other above-mentioned operations. With the ring 87 tightly secured, tapered seats 88, 89 are, respectively, turned on insert portion 82 and ring 87. A shell or sleeve 91 having radially extending flange 92 is slid onto the turned insert. This tip is without a skirt at the tapered end and hence is designed for use with acetylene. A skirt, as shown in Fig. 3, can be added, if desired.

The insert 81 has the usual central cutting oxygen passage 93 with a restriction 94 in the tapered portion 86. Mixed gases enter a chamber provided by the reduced section 84 and pass to completed passages 95.

Referring now to Figs. 11 to 17, there is shown a method of constructing a tip of the flat seat type. A differently shaped insert 101 is used, Fig. 11. This insert has a shoulder 102 at the tip seat end and a tapered section 103 having a fluted section 104. Centrally disposed therein is the usual cutting gas passage 105. Slots 106 are cut longitudinally into the insert and through shoulder 102 thereon.

Slid upon the insert 101 from the tapered end is a simple ring 107, Figs. 12, 13, recessed at 108 to encompass the flange 102 and extend to a point flush with a seat area 109 surrounding the cutting oxygen passage 105. The recess end edge of the ring 107 provides a second seat area 111 concentric with the seat 109. Face 112 of shoulder 102 is below the seats 109, 111 and contains the entrances of slots 106.

Ring 107 is secured to the insert in the usual manner and in this form of the invention does not have to be machined. A sleeve 113 is fitted over the insert to confine the slots 106 and provide the finished heating gas passages 114, Fig. 14. From these passages 114 the gas is passed into an annular chamber 115 about tapered portion 103 and then through passages 116 of the fluted section 104. This form of the invention has a propane skirt 117.

With the pre-mixed type of tips just described, not only may the shell or sleeve be removable from the insert but the seat rings can be removable, whereupon both the shell and seat ring are fixed to the insert and retained in the torch head by the tip nut.

Referring to Figs. 18 to 20, there is shown a tip wherein an insert 121 of hexagonal stock is used. This insert has usual cutting oxygen passage 122 and a seating portion 123. Forwardly of the seat 123 is a reduced section 124 and forwardly of the reduced portion 124 is a bearing portion 125 rounded to receive a double seat ring 126 having seats 127, 128 spaced by a reduced section 129.

From reduced section 129 there is drilled into seat portion 128 and toward the internal opening of the ring a series of metering ports 131 adapted to line up with slots 132 milled in the rounded bearing portion 125. Slots 132 extend from the reduced portion 124 and only a short distance into unfinished hexagonal portion 133, Fig. 19, as indicated at 134. Beyond the unfinished hexagonal portion 133, the insert is turned down to provide a rounded portion 135 and a tapered portion 136. In these portions 135, 136 are milled a series of slots 137.

A shell or sleeve 138 is removably fitted over the insert so that its flange 139 abuts the ring 126. Its internal dimension is such that its inner surface 140 fits tightly against edges or intersections 141 of flat faces 142 of the hexagonal portion 133, Fig. 20. Between the faces 142 and the inner surface 140 there will be provided passages 143 from which gases from passages 144 provided by slots 132 are received.

The gases from the passages 143 expand into a chamber 145 provided about the cylinder portion 135 and are distributed to the fluted passages 146 provided between slots 137 and tapered section 147 of shell 138.

Referring to Figs. 21 to 25, there is shown a tip utilizing an insert made from square stock. An insert 151 has cutting oxygen passage 152 and a seat 153 surrounding the inlet end of the passage, Fig. 21. Forwardly of the seat 153 is a turned-down portion 154 spaced by a reduced portion 155 from seat 153. With this form of the invention, no milling at all of slots is necessary. The corners of the insert are turned down as indicated at 156 to provide faces on which shell 157 can be slid and so that a good sealing connection can be made and by which slots 158 shaped in cross-section like the segment of a circle are formed between faces 159 and inner shell surface 161.

A double seat portion ring 162, which may be previously machined or later machined when assembled, is tightly fitted on the bearing portion 154. This ring has seats 163, 164 spaced by a reduced portion 165. From this reduced portion 165 there is projected a series of metering ports 166 which lead into the passages 167 beneath the inner surface of ring 162. Since portion 154 is turned down to a less diameter than portion 156, the passages 167 are small to control gas flow. Passages 167 lead into larger passages 158.

Shell 157 has a flanged end 168 which is brought tight against ring 162. The other end of insert 151 is tapered but is unsupported in a shell tapered portion 170 to provide an annular fuel gas passage 170'.

Referring to Figs. 26 to 34, there is shown still another form of tip using a square insert and two single seat rings arranged to avoid having to drill even in the seat ring. An insert or main body 171 has its rear portion turned down as indicated at 172 to receive first a ring 173 adapted to abut against a shoulder 174 of main body 171 and then a second ring 176 tapered at 177 to fit within a conical recess 178 in the first ring 173. The rings are retained on the portion 172 by peening inwardly with a punch small portions 179 of rearward ends of ring 176 so as to enter a space provided by a reduced portion 181 between portion 172 and an unmachined seat 182. On these rings and insert portion 182 are turned seats 183, 184, 185.

The insert has the usual cutting gas passage 186. Seat 185 surrounds the rearward end of the cutting gas passages and between seats 185 and 184 one of the heating gases is received and is discharged into passages 187, Fig. 34, provided by rings 176, 173, and faces 188 of the squared stock on portion 172. Ring 176 has its tapered portion 177 relieved at regions thereon in alignment with the insert faces 188, as shown at 191, to provide arcuate passages for the entrance of fuel gas between seats 183 and 184 into the passages 187 in the rings, no drilling at all being necessary in the seat rings for the provision of these passages.

A sleeve 192 is then inserted over the portions of the insert not contained by the rings so that its flange 193 abuts a ring 173. The forward end of the insert 175 is turned down to provide a smooth tapered portion 194 with a raised tapered section 195.

What is claimed is:

1. A multi-piece torch tip comprising an insert formed to provide when enclosed by shell and seat ring means a plurality of longitudinally extending heating gas passages in the assembled tip, and shell and seat ring means each fitted separately directly upon the insert, spaced longitudinally extending peripheral portions of the insert being in contact with the inner surfaces of the shell and the seat ring means to form passages for heating gas, the passages extending continuously under the shell and seat ring means in succession.

2. A multi-piece torch tip comprising an insert with a main bearing portion along part of its length and seat ring bearing portion along an adjacent part of its length, said bearing portions having longitudinally-extending slots extending continuously throughout the length of the bearing portions, and shell means surrounding the main bearing portion and separate seat ring means surrounding the seat ring bearing portion to enclose the slots and provide thereby a plurality of heating gas passages.

3. A multi-piece torch tip comprising an insert having a main portion of one diameter and a seat ring portion of less diameter, said insert having longitudinal slots extending through both portions with the bottoms of the slots being continuous and extending from one portion to the other, shell and seat ring means surrounding the portions to enclose the slots to provide the heating gas passages for the tip, the part of the passages under the seat ring thereby being of smaller section whereby to control gas flow through the passages.

4. A three part torch tip comprising an insert part fashioned to provide heating gas passages when tightly surrounded by a seat ring and a shell, a seat ring which serves as the seating portion of the tip surrounding one portion of the insert, spaced longitudinally extending peripheral portions of the insert being in contact with the inner surface of the seat ring to provide spaces between them forming parts of the heating passages, and a separate shell on an adjacent portion of the insert abutting the ring, said spaced longitudinally extending peripheral portions of the insert also being in contact with the inner surface of the shell to provide spaces between them to form the remaining parts of said passages.

5. A multi-piece torch tip comprising an insert having a seat portion on one end and a tapered portion on the opposite end, a seat ring bearing portion forwardly of the seat portion and spaced therefrom by a reduced section, and a main portion intermediate the seat ring bearing and tapered portions, said insert having longitudinal slots extending from the tapered portion through the seat ring bearing portion to receive gas from the reduced section, a seat ring tightly fitted to the insert seat ring bearing portion and cooperating with the slots to provide heating gas passages thereunder, said seat ring having two seat portions and a channel portion between the seat portions, the channel portion having metering ports connecting respectively with the heating gas passages under the seat ring, and a shell fitted over the insert tapered and main portions and abutting the seat ring to continue the heating gas passages from the seat ring portion.

6. A multi-piece torch tip comprising an insert having a seat portion on one end and a tapered portion on the opposite end, said insert tapered portion having a fluted or slotted tip end section, a seat ring bearing portion forwardly of the seat portion, a reduced section between the seat portion and the seat ring bearing portion, and a main portion intermediate the seat ring bearing portion and the tapered portion, said insert having longitudinal slots extending from the tapered portion through the seat ring bearing portion to receive gas from the reduced section, a seat ring tightly fitted to the insert seat ring bearing portion and cooperating with the slots to provide heating gas passages thereunder, said seat ring having two seat portions and a channel portion therebetween having metering ports connecting respectively with the heating gas passages under the seat ring, and a shell fitted over the insert tapered and main portions and abutting the seat ring to continue the heating gas passages from the seat ring, said shell cooperating with the slots of the fluted tapered section to provide a series of passages at the tip, an unfluted section of the tip cooperating with the shell to provide an annular chamber between the longitudinal slots and the fluted section.

7. A multi-piece torch tip comprising an insert having a seat portion at one end and a tapered portion at the opposite end, a reduced section in the insert immediately ahead of the seat portion, a main portion extending forwardly of the reduced section and having a raised shoulder immediately adjacent the reduced section, said main portion having longitudinal slots extending throughout the full extent of the same and including the raised shoulder, a seat ring fitted from the tapered portion end and retained on the main portion in engagement with the raised shoulder, a shell removably fitted to the main portion from the tapered portion end and abutting the seat ring, whereby said longitudinal slots are closed to provide the heating gas passages within the torch tip extending from the reduced section to the tapered portion.

8. A multi-piece torch tip comprising an insert made of square stock, said insert having an integral seat at one end, a reduced annular section forwardly thereof, a bearing portion formed by turning off the corners to one diameter and leaving flat faces of one width, and a main portion having its corners turned down to a diameter greater than the bearing portion diameter and leaving flat faces of a greater width than bearing portion faces, a double seat ring fitted on the bearing portion, spaced longitudinally extending peripheral portions of the insert adjacent its bearing portion flat faces being in contact with the inner surface of the double seat ring thereby providing gas passages of one size adjacent the respective flat faces, and a shell surrounding the main portion, spaced longitudinally extending peripheral portions of the insert adjacent its main portion flat faces being in contact with the inner surface of the shell to provide passages in continuation of the bearing portion passages and larger in size.

9. A multi-piece torch tip comprising an insert made of square stock, said insert having an integral seat at one end, a reduced annular section forwardly thereof and bearing and main portions having corners turned off but leaving a plurality of flat side faces spaced circumferentially about the insert, a double seat ring fitted on the bearing portion, spaced longitudinally extending peripheral portions of the insert adjacent its flat side faces being in contact with the inner surface of the double seat ring to provide spaces between them forming parts of the heating gas passages, and a shell fitted on the main portion, said spaced longitudinally extending peripheral portions of the insert also being in contact with the inner surface of the shell to provide spaces between them to form the remaining parts of said passages throughout the main portion.

10. The method of making a gas torch tip which consists of forming an insert with a seat portion at one end, a reduced annular recess forwardly thereof, a bearing portion for a seat ring forwardly of the annular recess, and a main portion, milling longitudinal slots in the main and bearing portions, fitting and securing a seat ring upon the bearing portion, turning the insert seat portion and the seat ring to provide seat faces thereon, and fitting and securing a shell upon the main portion and in abutting relationship with the seat ring, whereby to provide a torch tip with gas passages without a drilling operation and extending through the main and bearing portions and into communication with the annular recess.

11. The method of making a gas torch tip which consists of forming an insert with a seat portion at one end, a reduced annular recess forwardly thereof, and a main portion including a shoulder, milling longitudinal slots in the main portion and its shoulder, fitting and securing a seat ring upon the main portion and into abutting relationship with the shoulder thereof, and fitting and securing a shell upon the main portion and in abutting relationship with the seat ring whereby to provide a torch tip with gas passages without a drilling operation and extending through the main portion and its shoulder and into communication with the annular recess.

12. A multi-piece torch tip comprising an insert generally polygonal in transverse cross section, a shell and a seat ring means each fitted separately directly upon the insert, spaced longitudinally extending peripheral portions of the insert being in contact with the inner surfaces of the shell and seat ring means to form passages for heating gas, the passages extending under the shell and seat ring means in succession.

HOWARD G. HUGHEY.

(References on following page)

REFERENCES CITED

The following references are of record in the file of this patent:

UNITED STATES PATENTS

| Number | Name | Date |
|---|---|---|
| 1,195,298 | Vuilleumier | Aug. 22, 1916 |
| 1,281,871 | Strobot | Oct. 15, 1918 |
| 1,282,416 | Harris | Oct. 22, 1918 |
| 1,335,569 | Errett | Mar. 30, 1920 |
| 1,405,978 | Donigan | Feb. 7, 1922 |
| 1,408,194 | Harris | Feb. 28, 1922 |
| 1,424,163 | Harris | Aug. 1, 1922 |
| 1,502,286 | Anderson | July 22, 1924 |
| 1,547,388 | Harris | July 28, 1925 |
| 1,631,007 | Bucknam | May 31, 1927 |
| 1,634,274 | Smith | July 5, 1927 |
| 1,733,698 | Rose | Oct. 29, 1929 |
| 1,751,402 | Harris | Mar. 18, 1930 |
| 1,809,652 | Vincent | June 9, 1931 |
| 1,830,432 | Hammon | Nov. 2, 1931 |
| 1,977,782 | Thomas | Oct. 23, 1934 |
| 2,294,392 | Egger et al. | Sept. 1, 1942 |
| 2,334,257 | Egger et al. | Nov. 16, 1943 |
| 2,350,952 | Acord | June 6, 1944 |
| 2,351,787 | Smith | June 20, 1944 |
| 2,378,346 | Wigton | June 12, 1945 |

FOREIGN PATENTS

| Number | Country | Date |
|---|---|---|
| 236,590 | Germany | July 7, 1911 |